Nov. 5, 1968   L. GREGORY, JR   3,409,097
LOAD INDICATING APPARATUS
Filed Sept. 27, 1967

INVENTOR
Lester Gregory, Jr.
BY Shoemaker and Mattare
ATTORNEYS

United States Patent Office 3,409,097
Patented Nov. 5, 1968

3,409,097
LOAD INDICATING APPARATUS
Lester Gregory, Jr., Yellville, Ark. 72687
Filed Sept. 27, 1967, Ser. No. 670,841
10 Claims. (Cl. 177—210)

ABSTRACT OF THE DISCLOSURE

A vehicle such as a truck is provided with operating means and sensing means on relatively movable portions of the vehicle for indicating an overload condition. This operating means and sensing means is connected in an electrical network including lamp means for visually indicating the load condition of the vehicle.

Background of the invention

The present invention relates to load indicating apparatus and particularly to such apparatus for use with vehicles such as trucks wherein the frame thereof is movable with respect to the wheel and axle assemblies when loaded whereby operating means and suitable sensing means may be mounted on these relatively movable parts to actuate indicating means for indicating the degree of loading.

Vehicles such as trucks may be inadvertently overloaded from time to time, and it is desirable to provide apparatus which is adapted to provide an indication to personnel loading the truck when the maximum safe load has been exceeded. A readily visible warning should be given so that any overload condition may be quickly eliminated.

Prior art devices for accomplishing similar purposes have been of rather complex and expensive construction and have proven to be unreliable when subjected to the operating conditions of trucks or the like.

Summary of the invention

The present invention provides a simple and inexpensive construction incorporating a novel electrical circuit including visual indicating means at suitable locations on the vehicle so that they will be readily observed by personnel loading the truck. These visual indicating means according to the present invention take the form of different colored lamps which may either glow steadily or flash dependent upon the particular load condition so as to attract the attention of personnel loading the truck.

The operating means and sensing means which are mounted on exposed components of the vehicle are suitably protected to ensure foolproof operation under all operating conditions.

Description of the preferred embodiment

Figure 1:
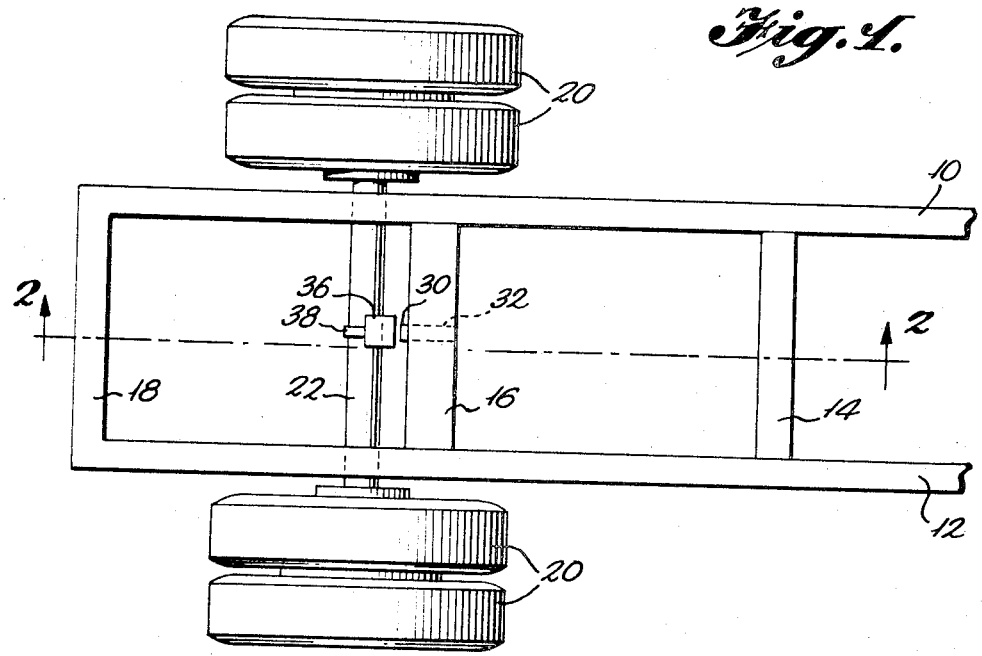
FIG. 1 is a top view illustrating the frame of a vehicle such as a truck and associated wheel and axle assembly.
Figure 2:
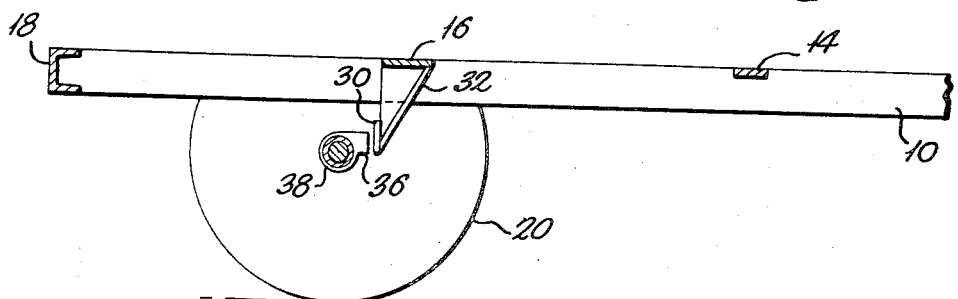
FIG. 2 is a sectional view taken substantially along line 2—2 of FIG. 1.

Referring now to the drawing wherein like reference characters designate corresponding parts throughout the several views, as seen in FIGS. 1 and 2, a vehicle frame such as the frame of a truck or the like includes a pair of longitudinally extending frame members 10 and 12 which are interconnected by a plurality of transversely extending cross frame members 14, 16 and 18, this frame structure being conventional in the art. A wheel and axle assembly includes a plurality of wheels 20 supported by an axle 22, this wheel and axle assembly being suspended from the frame in the usual conventional manner so that the frame is adapted to move vertically upwardly and downwardly with respect to the wheel and axle assembly.

A suitable enclosure or housing 30 formed of plastic or other material which will resist damage when exposed to the elements is mounted upon a bracket 32 which is secured to the cross frame member 16. It is apparent that enclosure 30 will move with the frame of the vehicle. A further enclosure or housing 36 which may be formed of a material similar to that of enclosure 30 is secured to a strap member 38 which is wrapped around the axle 22 so that the enclosure 36 is carried by and moves with the axle.

Figure 3:
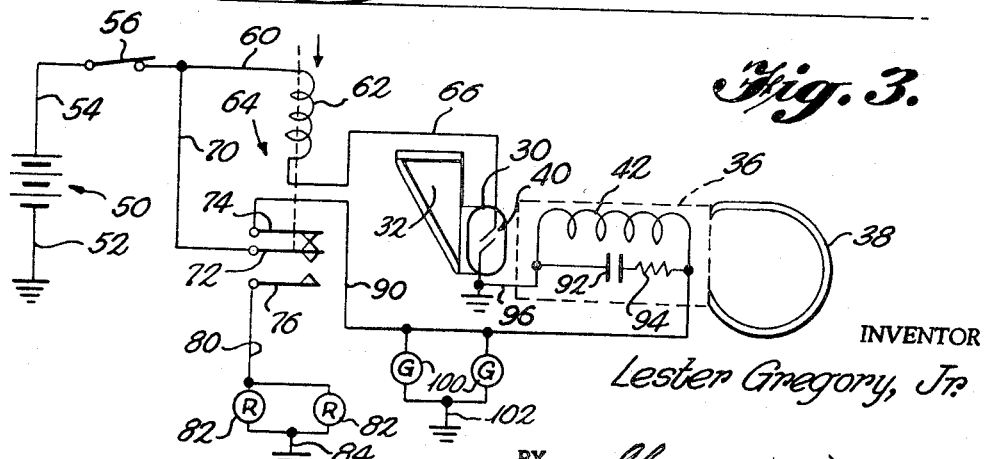
FIG. 3 is a schematic wiring diagram illustrating the electrical network of the present invention.

Referring now to FIG. 3 of the drawing, the bracket 32 and enclosure 30 are illustrated somewhat schematically, and a proximity switch 40 of conventional construction is disposed within enclosure 30. The enclosure 36 is indicated by a dotted line in this figure and the strap 38 is illustrated in a schematic manner. A means for producing a magnetic field is disposed within enclosure 36 and as illustrated comprises a coil 42.

As seen in FIG. 3, the electrical network of the present invention includes a source of electrical energy shown in the form of a battery 50. One side of the battery is connected by lead 52 with ground. The other side of the battery is connected by lead 54 with one side of a manually operated on-off switch 56 which may be mounted in a suitable location such as in the operator's cab of the vehicle for energizing or de-energizing the load indicating apparatus.

Switch 56 is connected through lead 60 with operating coil 62 of a conventional relay indicated generally by reference numeral 64. The coil 62 is in turn connected by lead 66 with the proximity switch 40 and thence to ground.

Switch 56 is also connected through lead 70 to the movable contact 72 of the relay. A normally closed fixed contact 74 is provided and a normally open fixed contact 76 is provided. In other words, contact 72 engages contact 74 in the normally closed position of the relay when the operating coil 62 thereof is not energized.

Contact 76 of the relay is connected by lead 80 with a pair of indicating means in the form of lamps 82 connected in parallel with one another and connected by lead 84 to ground. The lamps 82 may be of a suitable color such as red as indicated by the reference characters R, and these lamps when illuminated indicate an overload condition as hereinafter explained. The lamps may be disposed at any suitable location on the vehicle, and for example one of the lamps may be disposed within the operator's cab, and the other of the lamps may be disposed somewhere on the top of the vehicle so as to be readily visible.

Contact 74 of the relay is connected through a lead 90 with the aforementioned coil 42 of the electromagnet. A capacitor 92 and a resistor 94 are connected in parallel with the coil 42 as illustrated for a purpose hereinafter described, components 42, 92 and 94 being connected with ground through lead 96.

Lead 90 is also connected with a pair of lamps 100 which are connected by lead 102 with ground. These lamps 100 are preferably of a different color from the lamps previously described and may be for example green as indicated by reference characters G. Lamps 100 when lit indicate that the vehicle is safely loaded and that no overload condition exists. The lamps may be positioned similar to the lamps 82 previously described, so that one of the lamps 100 could be positioned in the operator's cab and the other lamp 100 positioned somewhere on the top of the truck.

Considering now the operation of the apparatus, when the operator of the vehicle closes the switch 56, the load indicating apparatus becomes operative. The relay is in its normally closed position with contact 72 in engagement with contact 74. Accordingly, a circuit is closed through these contacts of the relay and thence through the transformer coil 42 to produce a magnetic field adjacent the axle of the vehicle. The circuit is also closed through lamps 100 so that these lamps will be energized, and these lamps will glow steadily. This condition of operation will exist as long as the proximity switch 40 does not enter the magnetic field of electromagnet 42 so that the proximity switch is caused to operate. It will be noted that the circuit through the operating coil 62 of the relay is open as long as the proximity switch 40 is open.

When the vehicle is overloaded, the frame will lower to such an extent with respect to the wheel and axle assembly that the proximity switch 40 is positioned adjacent the electromagnet, and the magnetic field thereof will cause the proximity switch to close. It is of course apparent that the proximity switch location may be suitably adjusted by adjusting the bracket 32 upon which it is mounted so that the proximity switch will only be closed at such a position that an overload condition exists.

When the proximity switch is closed, the relay coil 62 is operated so as to move contact 72 of the relay into engagement with contact 76 thereby causing the circuit to be closed through the lamps 82 whereupon the red lamps will go on. At the same time, the circuit is open through the green lamps 100, and they will be extinguished. At the same time, the circuit through the coil 42 of the electromagnet will be open. The capacitor 92 will then discharge through the coil 42 causing the electromagnet to remain operative to produce a magnetic field for a short period of time whereupon the electromagnet will become de-energized thereby causing the proximity switch to open.

When the proximity switch 40 opens, the relay will return to its normally closed position as seen in FIG. 3. If the proximity switch is still disposed within the magnetic field produced by the electromagnet, the relay will again be operated as aforedescribed, and this cycle of events will continue to occur as long as the proximity switch remains in this position. As a result, when an overload condition is present, the red and green lamps will alternately flash to indicate that such a condition has occurred.

When the extra weight is removed from the vehicle, the proximity switch will move out of the magnetic field of the electromagnet, and the components will return to and remain in the operative position shown in FIG. 3.

Any suitable number of cooperating proximity switches and electromagnets may be employed on various sides of one or more of the axles of the vehicle, and these sensing means can be connected either in parallel or series as desired to determine the presence of an overload condition.

I claim:

1. Load indicating apparatus comprising a first relatively movable component and a second relatively movable component, an electrical network including a source of electrical energy, means for producing a magnetic field, sensing means operable when positioned adjacent said means for producing a magnetic field, a relay switch means for alternately connecting said source of electrical energy with either said means for producing a magnetic field or said sensing means, said relay switch means including an operating coil connected in series with said source of electrical energy and said sensing means for operating the relay switch means in accordance with operation of said sensing means, and indicating means connected with said switch means for indicating the load condition in accordance with the relative position of said two movable components.

2. Apparatus as defined in claim 1 wherein said means for producing a magnetic field comprises an electromagnet and said sensing means comprises a proximity switch.

3. Apparatus as defined in claim 2 wherein said relay switch means includes a normally open contact and a normally closed contact, said normally open contact being connected with said electrical magnet.

4. Apparatus as defined in claim 2 wherein said relay switch means includes a normally open contact and a normally closed contact, said indicating means including lamp means connected with said normally open contact.

5. Apparatus as defined in claim 2 wherein said relay switch means includes a normally open contact and a normally closed contact, said indicating means including first lamp means connected with said open contact, said indicating means including second lamp means connected with said closed contact.

6. Apparatus as defined in claim 2 wherein the operating coil of said relay switch means is connected in series with said source of electrical energy and said proximity switch.

7. Apparatus as defined in claim 2 wherein said operating coil of the relay switch means is connected in series with said source of electrical energy and said proximity switch, said relay switch means including a normally open contact and a normally closed contact, said indicating means including first lamp means operatively connected with said normally open contact, said indicating means including second lamp means operatively connected with said normally closed contact, said normally closed contact also being connected with said electromagnet.

8. Apparatus as defined in claim 3 wherein said indicating means includes lamp means connected with said normally closed contact.

9. Apparatus as defined in claim 5 wherein said closed contact is also connected with said electromagnet.

10. Apparatus as defined in claim 7 wherein said first lamp means and said second lamp means are of different color to readily visually apprise a person of the load condition of the associated components.

References Cited

UNITED STATES PATENTS

| | | | |
|---|---|---|---|
| 3,092,818 | 6/1963 | Potschka | 177—210 X |
| 3,097,714 | 7/1963 | Vickery | 177—210 |
| 3,150,729 | 9/1964 | Mehki | 177—210 XR |

RICHARD B. WILKINSON, *Primary Examiner.*

G. H. MILLER, JR., *Assistant Examiner.*